Feb. 4, 1930.  R. W. JANDA  1,745,490
CLUTCH CONTROL MOUNTING
Original Filed Sept. 25, 1926  3 Sheets-Sheet 3

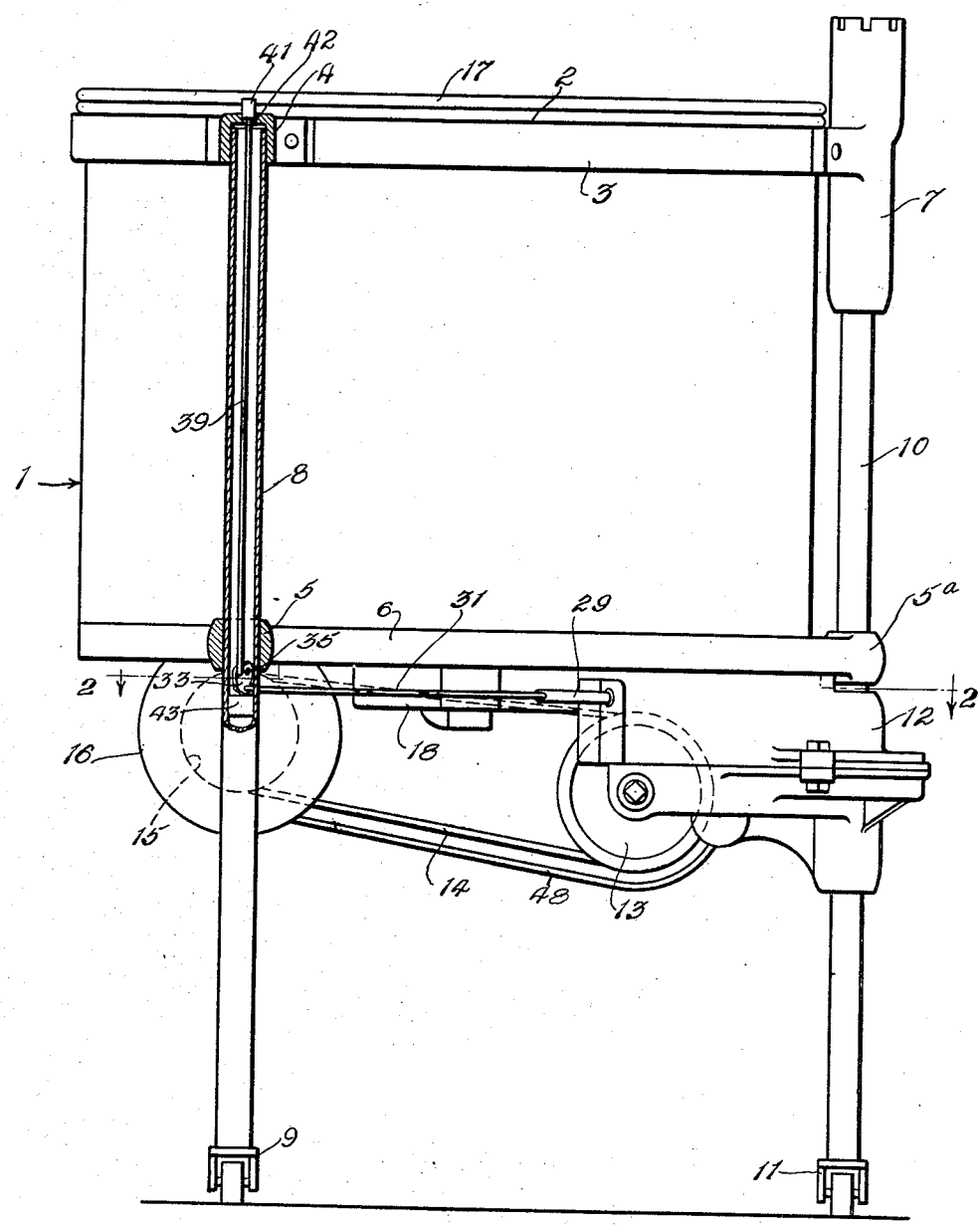

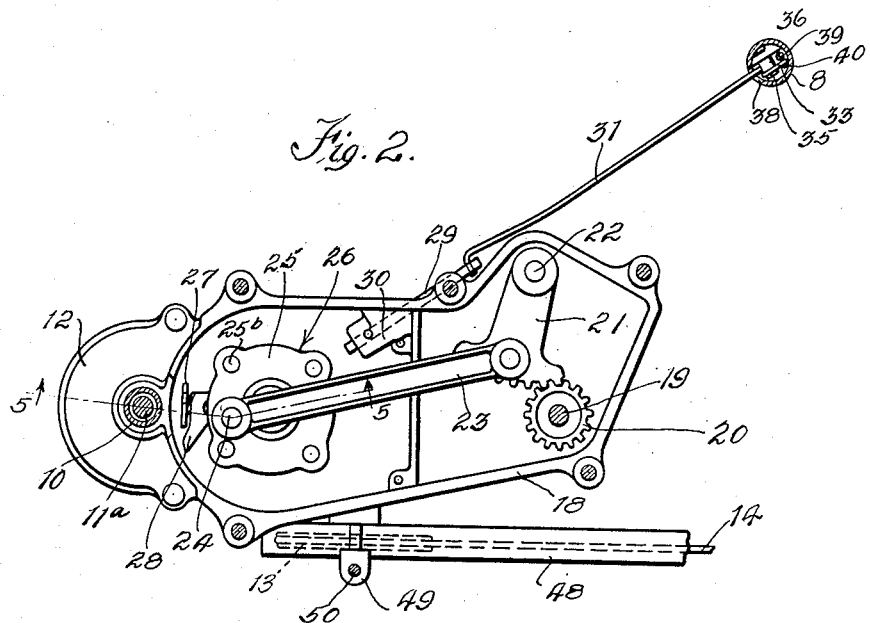
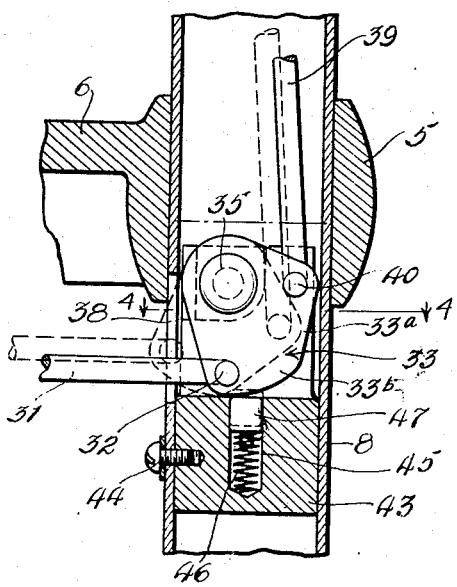
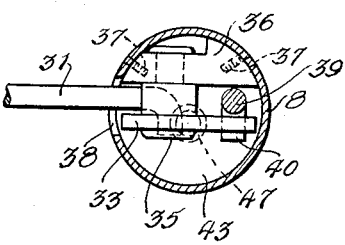

Witness:
William P. Kilroy

Inventor:
Rudolph W. Janda
By Brown, Jackson, Boettcher & Diener
Attys

Patented Feb. 4, 1930

1,745,490

UNITED STATES PATENT OFFICE

RUDOLPH W. JANDA, OF BERWYN, ILLINOIS, ASSIGNOR TO CONLON CORPORATION, OF CICERO, ILLINOIS, A CORPORATION OF ILLINOIS

CLUTCH-CONTROL MOUNTING

Original application filed September 25, 1926, Serial No. 137,748. Divided and this application filed November 25, 1927. Serial No. 235,440.

This invention relates to clutch control means, and more particularly to a mounting for such means adapted especially for use in washing machines.

It is very desirable, in washing machines, that simple means be provided for controlling the clutch which throws the machine into and out of operation, and that such means be so positioned as to be readily accessible to the operator. Preferably this means should be disposed to be actuated from a point adjacent the top of the washing machine, so that it can be quickly located. It is also desirable that the means for controlling the clutch be effectively housed so as to be protected against injury and to eliminate possibility of catching of the operator's clothing in the control means and consequent interference with operation of the clutch. The control means should also, preferably, be arranged in such manner that it is uni-directional in its operation avoiding possible confusion as to its direction of operation in the mind of the operator at a critical time. Further objects and advantages will appear from the detailed description.

In the drawings:

Fig. 1 is an elevation of a washing machine showing a control means constructed in accordance with my invention as applied, the leg housing the control rod and associated parts being shown partly in section;

Fig. 2 is a fragmentary horizontal sectional view taken in a plane immediately above the housing for the clutch and associated parts, this section being taken substantially on line 2—2 of Fig. 1;

Fig. 3 is a vertical sectional view through the leg housing the control rod and associated parts taken adjacent the bottom of the tank;

Fig. 4 is a horizontal sectional view taken through the leg housing the control rod in a plane a short distance above the operating rod, parts being shown in elevation, this section being taken substantially on line 4—4 of Fig. 3;

Figure 5:
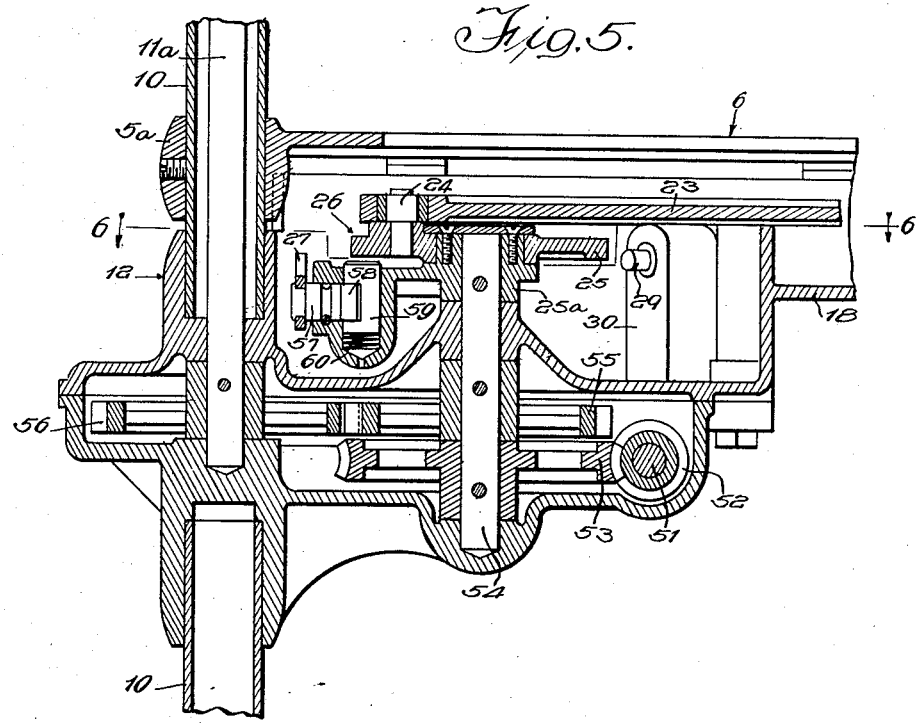
Fig. 5 is a sectional view, on an enlarged scale, through the operating gearing and clutch and associated parts, taken substantially on line 5—5 of Fig. 2.
Figure 6:
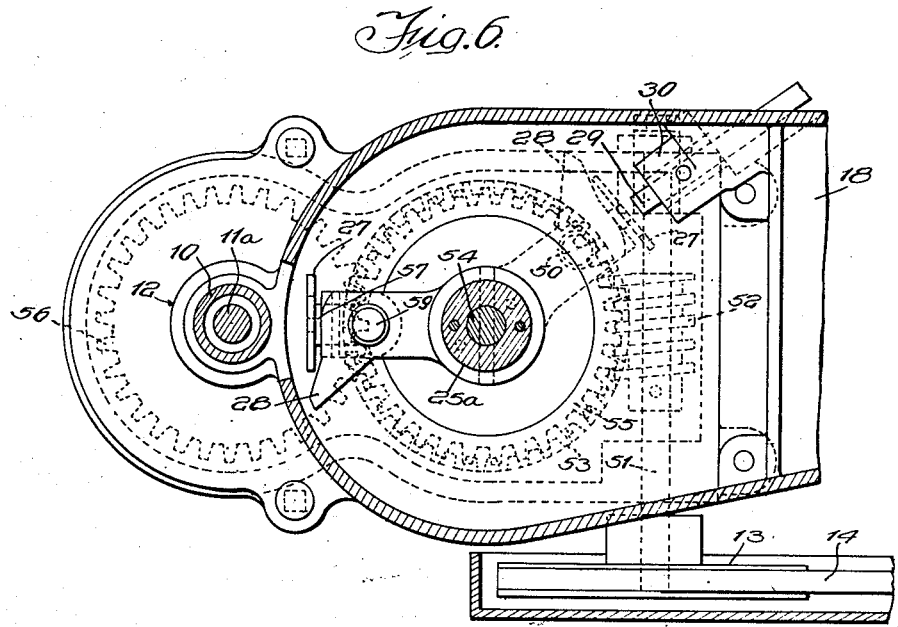
Fig. 6 is a section taken substantially on line 6—6 of Fig. 5.

This application is a division of my application for washing machine, filed September 25, 1926, Serial No. 137,748. In my copending application I have disclosed fully the construction and operation of the clutch and associated parts, as well as the means for driving the agitator of the washing machine and the wringer. The present invention relates more particularly to the mounting for the clutch control means and the various parts which have been disclosed fully in my copending application will be referred to herein briefly, a detailed disclosure of such parts not being necessary to an understanding of the present invention.

This invention is intended more particularly for use in connection with a washing machine which includes a tank 1 provided at its upper end with a bead 2 which rests upon a supporting ring 3 having two socket members 4 secured thereto and disposed in alignment with eye brackets 5 rigid with a lower supporting frame 6. A sleeve bracket 7 is also secured to ring 3 and is disposed in alignment with an eye bracket 5ª of frame 6. In practice there are three sets or pairs of eye brackets and associated socket members and sleeve bracket 7, which receive the three supporting legs, two of which are shown. Leg 8 is of tubular construction and extends through the eye bracket 5, the upper end of this leg fitting into socket member 4. The leg may be secured in position by pins secured in the eye bracket and the socket member and engaging the leg at opposite points, or in any other suitable manner. At its lower end the leg is provided with a suitable castor 9. A tubular leg 10 is secured in the eye bracket 5ª and the sleeve bracket 7 and is also provided at its lower end with a castor 11. This leg 10 provides a housing for a shaft 11ª which is driven through suitable gearing in a housing 12, from a pulley 13, this pulley being driven by a belt 14 from a pulley 15 of an electric motor 16 supported beneath tank 1 from the frame 6 in a suitable manner. The upper end of sleeve bracket 7 is castellated, as illustrated, for cooperation with a latch carried by a swinging wringer mounted on the sleeve bracket to be swung into position about the axis of shaft 11ᵃ in a known manner. The tank is closed by a suitable removable cover 17.

Housing 12 is provided with an extension 18 which projects beneath the tank, this housing being suitably secured to frame 6 and supported thereby. A shaft 19, which extends upwardly through the bottom of the tank and carries the agitator of the washing machine, extends into portion 18 of the housing and has a pinion 20 secured on its lower end. A rack 21 is pivoted at 22 in the housing and meshes with this pinion. This rack is connected by a link 23 to a crank pin 24 secured on the upper driven member 25 of a clutch indicated in its entirety by 26. This clutch includes a lower driving member 25ᵃ which is driven, simultaneously with shaft 11ᵃ from the pulley 13. This lower driving member of the clutch carries actuating means in the form of a multi-armed wheel 27 and associated parts whereby the driving member of the clutch is clutched to the driven member 25 for operating the same, or declutched therefrom, upon actuation of the wheel 27. This wheel is disposed in advance of an arm 28 carried by and rigid with the driving member of the clutch and disposed to return the clutch operating member to inoperative position after each actuation of the clutch.

For actuating the multi-armed wheel 27 I provide an operating member 29 in the form of a plunger operating through a boss 30 integral with the housing 12. This member is disposed, when in its inner or operative position, in the path of travel of the wheel 27 so as to be struck by one of the arms thereof turning the wheel through a partial rotation and actuating the clutch. Immediately after this operation takes place the arm 28 contacts with the inner end of the operating member 29 and returns it to inoperative position. An operating rod 31 is pivotally secured to the outer end of member 29. The outer end of this rod is pivotally secured at 32 to the lower corner of a plate 33 having substantially the form of a trapezium this plate being pivotally mounted at 35 on a bracket 36 secured within the leg 8 by screws 37, or in any other suitable or preferred manner. As will be noted more clearly from Figure 3, plate 33 is disposed adjacent the lower end of eye 5 and leg 8 is provided in its inner portion with a slot 38 which accommodates the outer portion of operating rod 31. A control rod 39 is pivotally connected at its lower end at 40, to plate 33 at the corner thereof opposite to the outer end of rod 31. This operating rod extends upwardly within leg 8 and receives a button 41 secured on the upper end of the rod in suitable manner, this button operating through an opening 42 through the top wall of socket 4. When the operating member 29 is in its retracted or inoperative position the button 41 is projected above the socket 4 at the top of tank 1 being thus disposed so as to be readily visible and accessible for use at all times.

A cylindrical plug or block 43 is secured in leg 8 beneath and immediately adjacent plate 33, by means of a screw 44 or in any other suitable manner. This block is provided with a bore 45 extending from its upper end. This bore receives an expansion coil spring 46 which is confined between the lower end of the bore and the lower end of a plunger 47 operating in the upper portion of the bore. This plunger is disposed to contact with the edge of plate 33. Referring to Figure 3, it will be noted that the point of contact of plunger 47 with the edge of the blade is slightly beyond or outside of the axis of the pivot 35. The plunger thus has a tendency, when the clutch control means is in its normal, inoperative condition, to swing the plate 33 outwardly holding the operating rod 31 and the operating member 29 in retracted or inoperative position. When the control rod 39 is depressed into operative position, the plate 33 and associated parts are moved into the position illustrated by dotted lines in Figure 3, in which position the plunger 47 contacts with the portion 33ᵃ of the edge of plate 33 outside of and adjacent the corner 33ᵇ, side 33ᵃ of the plate being disposed at a decided inclination downwardly and inwardly toward the block 43. The plunger thus exerts a pressure on the portion 33ᵃ of the plate at such an angle thereto as to tend to swing the plate inwardly about its pivot, thus holding the rod 31 and the operating member 29 in projected position. The plunger 47, in conjunction with its spring and associated parts, provide simple and efficient means for yieldingly holding the plate 33 and the parts connected thereto in either operative or inoperative position.

When it is desired to throw the machine into operation, assuming that the clutch 26 is disengaged, the button 41 is depressed. This projects the member 29 into the path of travel of the multi-armed wheel 27 thus actuating the clutch and throwing the machine into operation. Immediately thereafter the wheel 27 passes out of contact with member 29, arm 28 contacts with this member, and returns it to inoperative position so that the button 41 is raised and thus returned to its normal position so as to be readily depressed when it is desired to throw the machine out of operation. When the button is again depressed, the member 29 is projected into the path of the wheel 27 which is again actuated to throw the clutch out of operation, arm 28 of the driving clutch member acting to return the button 41 to its raised position. It will thus be seen that the clutch control means is uni-directional in its operation avoiding possible confusion on the part of the operator when it is desired to start or stop the machine. It will also be noted that the control rod and associated parts, as well as the outer portion of the operating rod 31, are effectively housed in the leg 8 so as to be protected thereby and eliminate possibility of the operator's clothing becoming entangled in these parts. As the operating rod 31 and the member 29 and associated parts are disposed beneath the tank 1, such parts are effectively protected and possibility of the operator's clothing becoming caught in these parts is eliminated.

Preferably, though not necessarily, a suitable guard or housing 48 encloses the pulleys 13 and 15 and the connecting belt 14, this housing being supported from the frame 6 by suitable brackets 49 and securing member 50, or in any other suitable manner.

The gearing and clutch arrangement for operating and controlling the machine is similar to that of my copending application above identified, of which this application is a division. Pulley 13 is secured on a shaft 51 rotatably mounted in casing 12. A worm 52 is pinned on this shaft and meshes with a worm wheel 53 pinned on vertical shaft 54. A spur gear 55, pinned on shaft 54 above wheel 53, meshes with a spur gear 56 pinned on shaft 11$^a$ which is thus driven from shaft 54. Clutch member 25$^a$ is pinned on the upper end of shaft 54 to turn therewith, and clutch member 25 is loosely mounted upon the upper reduced portion of member 25$^a$, and is provided with spaced openings 25$^b$ disposed equidistant from shaft 54. Star wheel 27 is secured on the outer end of a stud shaft 57 mounted, in the outer end of arm 28, to turn on a horizontal axis. The inner end of this stud shaft is cut away from opposite sides to provide a reduced extension 58 which projects into a slot in a plunger 59 mounted for vertical reciprocation in arm 28. The stud shaft 57 is held against axial movement by a pin which engages into a circumferential groove in the stud shaft, in a known manner. Plunger 59 is urged upwardly by an expansion coil spring 60 confined between the plunger and the bottom wall of the pocket or recess in which this plunger operates. The plunger is disposed the same distance from shaft 54 as the openings 25$^b$ of member 25 of the clutch. With the parts in the relative positions illustrated in Fig. 5, the clutch member 25$^a$ and arm 28 rotate with shaft 54, the upper clutch member 25 remaining stationary. Upon the star wheel 27 being actuated the plunger is released and is projected upwardly by spring 60 and enters one of the openings of member 25. This member is thus clutched to shaft 54, through member 25$^a$, for rotation therewith. When the star wheel is again actuated, stud shaft 57 is returned to the position of Fig. 5, thus declutching member 25 from shaft 54 and throwing the agitator out of operation.

What I claim is:

1. In a washing machine having a tank, supporting legs therefor, one of the legs being tubular, a clutch, an operating member for actuating the clutch, an operating rod connected to said member, a control rod within the tubular leg and projecting above the upper end thereof, operating connections within said leg between the lower end of the control rod and the outer end of the operating rod, means within the tubular leg for releasably holding the operating rod in each of its adjusted positions, and means for returning the operating rod to inoperative position subsequent to each actuation of the clutch, the control rod being in raised position when the operating rod is in inoperative position.

2. In a washing machine having a tank, supporting legs therefor, one of the legs being tubular, a clutch including a driving member and a driven member, an operating member for actuating the clutch, an operating rod connected to said member, a control rod within the tubular leg and having operating connection with said operating rod, the control rod projecting above the leg when the operating rod is in inoperative position, yielding means within the leg for holding the operating rod in either of its positions, and a member carried by the driving member of the clutch for returning the operating member and the operating rod to inoperative position subsequent to each actuation of the clutch.

3. In combination, a clutch including a driving member and a driven member, a clutch actuating member carried by said driving member, an operating member movable into and out of the path of travel of the actuating member for causing operation thereof, means for projecting the operating member into operative position, yielding means for holding the operating member in either operative or inoperative position, and a member carried by the driving member of the clutch and disposed to contact with and return the operating member to inoperative position subsequent to each actuation of the clutch.

In witness whereof, I hereunto subscribe my name this 18th day of November, 1927.

RUDOLPH W. JANDA.